(12) United States Patent
Murata

(10) Patent No.: US 10,303,680 B2
(45) Date of Patent: May 28, 2019

(54) DATA PROCESSING APPARATUS AND DATA PROCESSING METHOD

(71) Applicant: Kabushiki Kaisha Toshiba, Minato-ku (JP)

(72) Inventor: Akifumi Murata, Hino (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 233 days.

(21) Appl. No.: 15/222,172

(22) Filed: Jul. 28, 2016

(65) Prior Publication Data

US 2016/0335313 A1   Nov. 17, 2016

Related U.S. Application Data

(63) Continuation of application No. PCT/JP2014/052918, filed on Feb. 7, 2014.

(51) Int. Cl.
   *G06F 17/30* (2006.01)
   *G06F 16/23* (2019.01)

(52) U.S. Cl.
   CPC .......... *G06F 16/2379* (2019.01); *G06F 16/23* (2019.01)

(58) Field of Classification Search
   CPC ......... G06F 17/30377; G06F 17/30345; G06F 16/2379
   See application file for complete search history.

(56) References Cited

U.S. PATENT DOCUMENTS

| | | | |
|---|---|---|---|
| 6,564,215 B1 * | 5/2003 | Hsiao | G06F 11/1469 |
| 7,321,898 B1 * | 1/2008 | Luo | G06F 17/30457 |
| 2006/0041592 A1 * | 2/2006 | Nanaumi | G06F 17/211 |
| 2011/0004638 A1 | 1/2011 | Nishiyama | |
| 2011/0055182 A1 * | 3/2011 | Buban | G06F 17/30171 707/704 |
| 2011/0202564 A1 | 8/2011 | Kodaka et al. | |
| 2013/0060815 A1 | 3/2013 | Saeki | |

(Continued)

FOREIGN PATENT DOCUMENTS

| JP | 2006-92503 A | 4/2006 |
|---|---|---|
| JP | 4392676 | 1/2010 |
| JP | 2010-198200 | 9/2010 |

(Continued)

OTHER PUBLICATIONS

International Search Report dated Mar. 18, 2014 in PCT/JP2014/052918 filed Feb. 7, 2014 (with English translation).

(Continued)

*Primary Examiner* — Huawen A Peng
(74) *Attorney, Agent, or Firm* — Oblon, McClelland, Maier & Neustadt, L.L.P.

(57) ABSTRACT

According to one embodiment, a data processing apparatus is applied to a data management system. The data processing apparatus is connected to a client terminal, a first storage medium and a second storage medium to be capable of communicating with the client terminal and the first and second storage mediums. The first storage medium stores a plurality of tables which are identified by table names and include a plurality of column names and columns corresponding to the column names, respectively. The second storage medium stores some data in the tables stored in the first storage medium and keys for use in reading out the data, in association with each other.

8 Claims, 4 Drawing Sheets

(56) References Cited

U.S. PATENT DOCUMENTS

2013/0290282 A1\* 10/2013 Faerber ............ G06F 17/30153
707/693

FOREIGN PATENT DOCUMENTS

| JP | 2011-165148 | 8/2011 |
| JP | 2013-54521 | 3/2013 |
| JP | 2013-152557 | 8/2013 |

OTHER PUBLICATIONS

Written Opinion dated Mar. 18, 2014 in PCT/JP2014/052918 filed Feb. 7, 2014.

\* cited by examiner

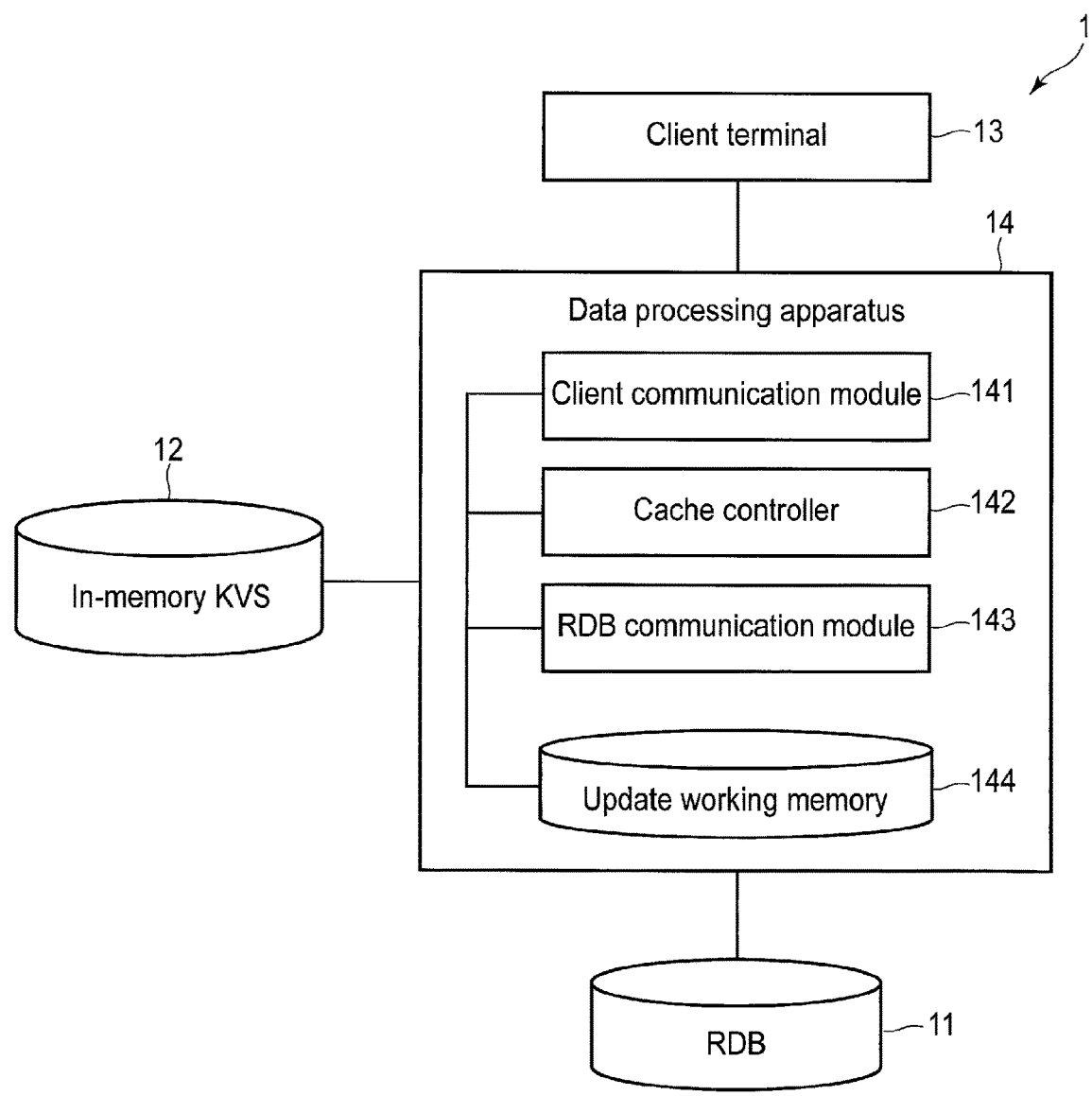
F I G. 1

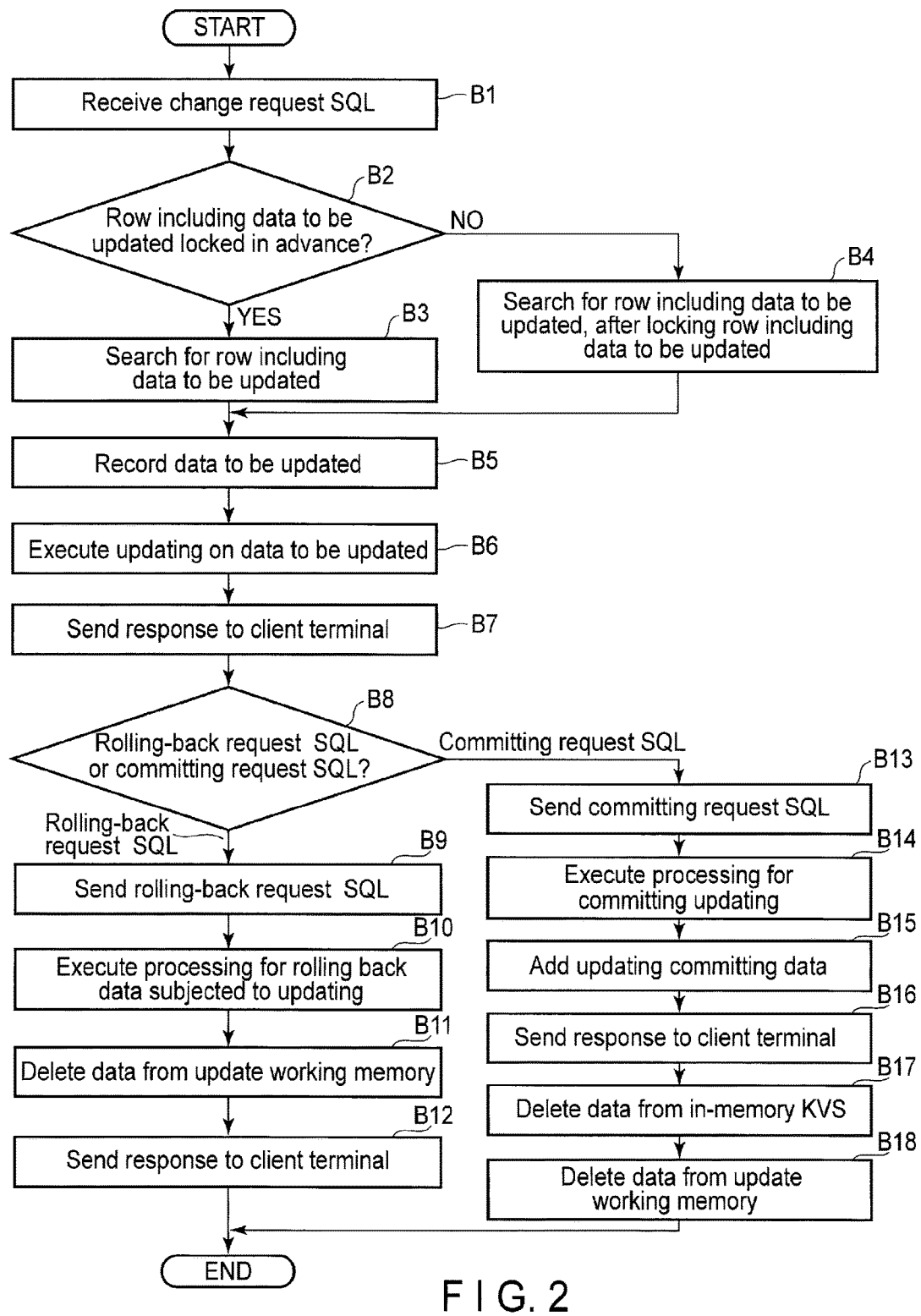
F I G. 2

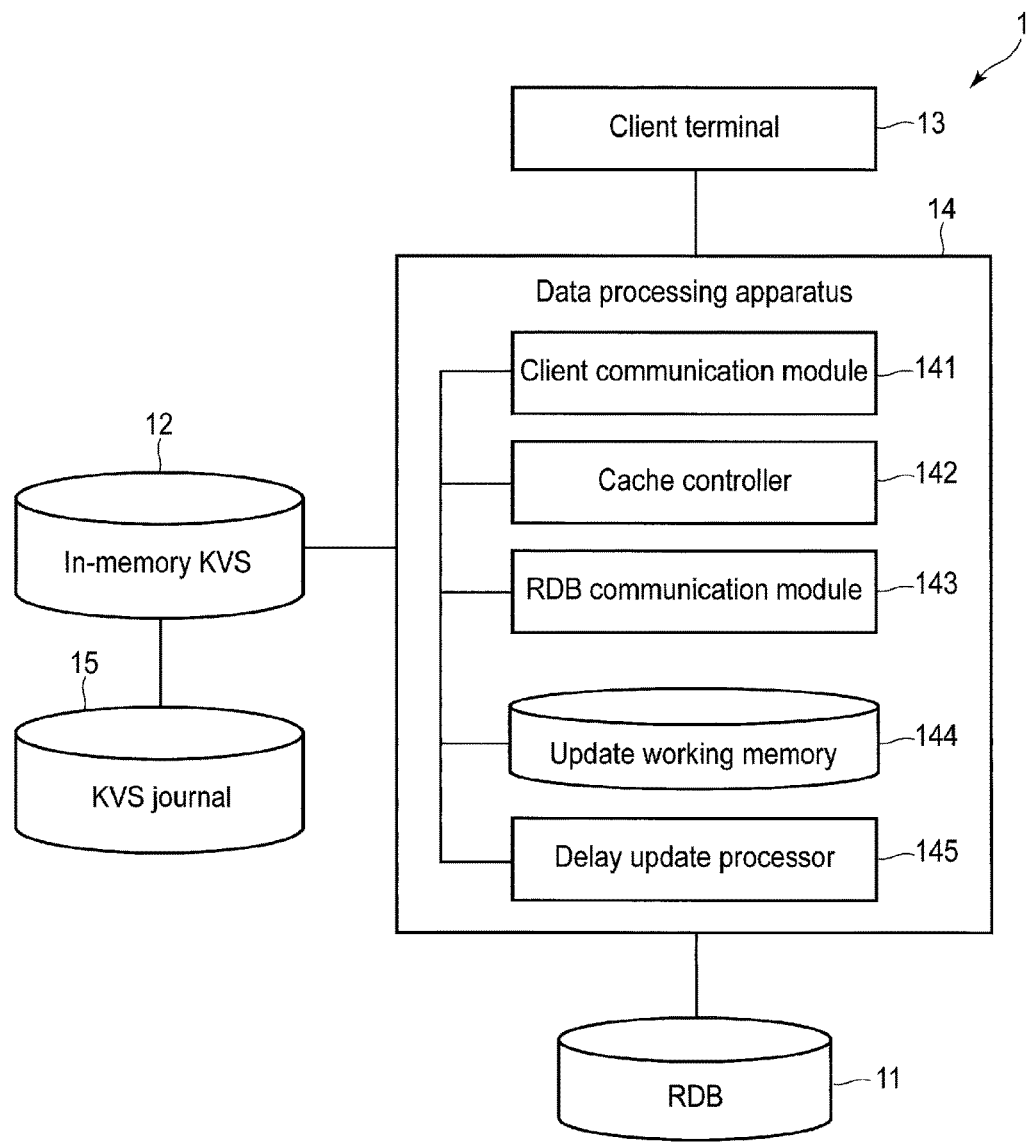
F I G. 3

DATA PROCESSING APPARATUS AND DATA PROCESSING METHOD

CROSS REFERENCE TO RELATED APPLICATIONS

This application is a Continuation application of PCT Application No. PCT/JP2014/052918, filed Feb. 7, 2014, the entire contents of which are incorporated herein by reference.

FIELD

Embodiments described herein relate generally to a data processing apparatus and a data processing method.

BACKGROUND

In recent years, as data management methods, data management methods using in combination a relational database (RDB) and a key value store (KVS) which is an in-memory have become widespread. The data management methods can shorten the time required for a client terminal to acquire desired data, as compared with a data management method using an RDB only.

In general, in a data management method using an RDB only, it is necessary to search a larger number of tables stored in the RDB for a table including desired data, in response to an access of a client terminal, and acquire the desired data from the table. Inevitably, it takes much time for the client terminal to acquire the desired data.

On the other hand, in a data management method using an RDB and a KVS which is an in-memory, first, it is confirmed whether desired data is stored as a cache in the KVS. In the KVS, i.e., the in-memory, the desired data and a key for acquiring the desired data are stored in a one-to-one correspondence. Thus, if the desired data is stored as a cache, the client terminal can dramatically more speedily acquire the desired data than in the data management method using the RDB only. If the desired data is not stored as a cache, the client terminal will change the storage to be access to the RDB, and acquire the desired data from the RDB. However, since the desired data acquired at this time is registered as a cache in the KVS, from then on, the client terminal can acquire the desired data in a shorter time.

In such a manner, the data management method using the RDB and the KVS in combination enables the client terminal to acquire desired data in a shorter time than the data management method using the RDB only.

However, in the case where the RDB and the KVS are used in combination, if desired data is not stored as a cache in the KVS, the client terminal itself needs to change the storage to be accessed to the RDB. This is inconvenient. To be more specific, a user who operates the client terminal needs to give a description for changing the storage to be accessed from the KVS to the RDB.

Also, in the data management method using the RDB and the KVS in combination, there is a possibility that a disadvantage will be caused when data stored in the RDB is updated. In general, in the case where data stored in the RDB is updated, if data identical to the stored data is stored as a cache in the KVS, it also needs to be updated. However, it is complicated to give a description indicating an operation for causing the cache stored in the KVS to be updated in accordance with the update of the data stored in the RDB. Under present circumstances, generally, the above operation is not performed. Thus, if the data stored in the RDB is updated, but data stored as a cache in the KVS is not updated, there is a possibility that the client terminal will acquire the data not updated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram schematically illustrating a configuration example of a data management system to which a data processing apparatus according to a first embodiment is applied.

FIG. 2 is a flow chart illustrating an example of a procedure of data updating processing to be executed by the data processing apparatus according to the first embodiment.

FIG. 3 is a block diagram schematically illustrating a configuration example of a data management system to which a data processing apparatus according to a second embodiment is applied.

DETAILED DESCRIPTION

Figure 4:
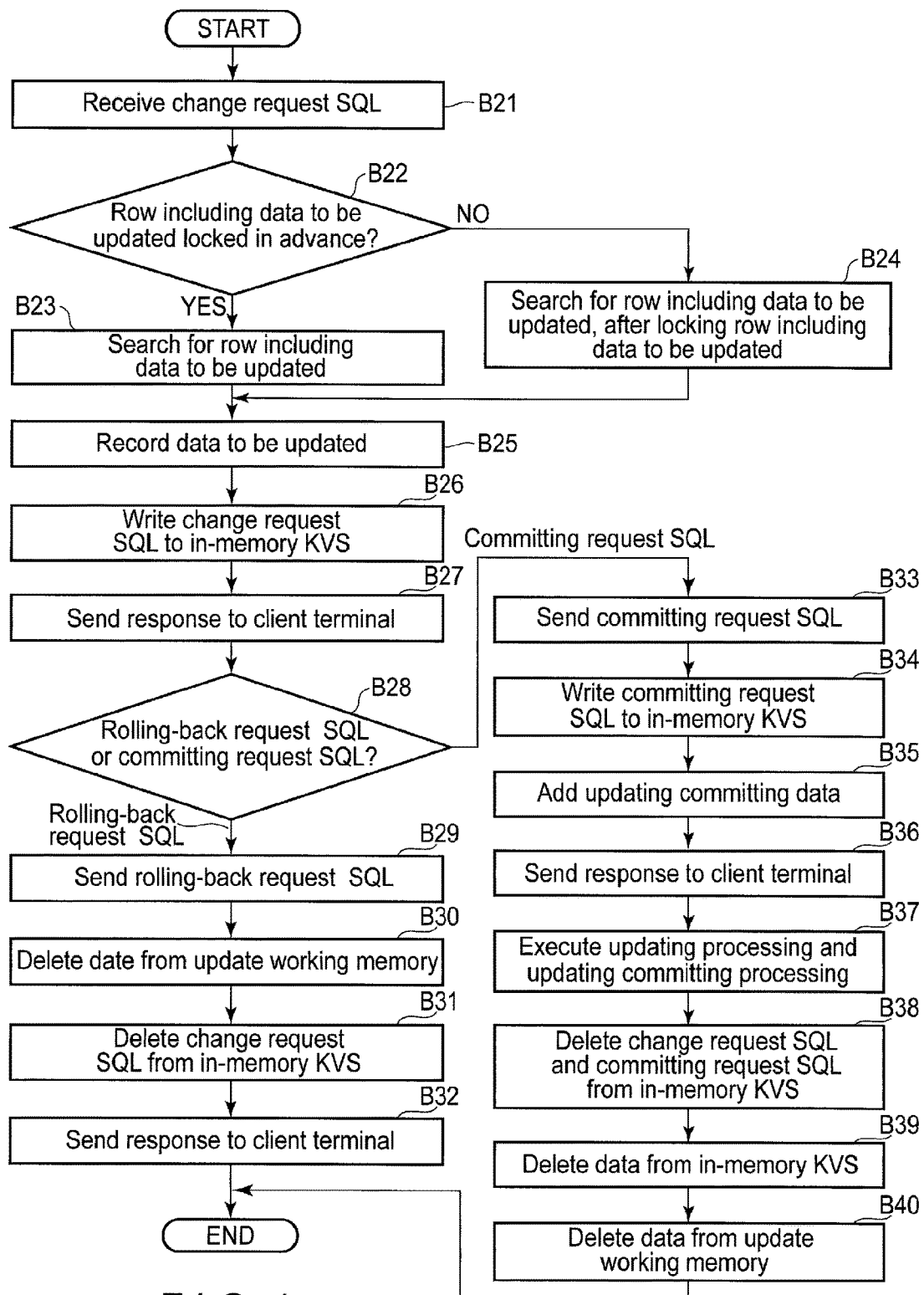
FIG. 4 is a flow chart illustrating an example of a procedure of data updating processing to be executed by the data processing apparatus according to the second embodiment.

Various embodiments will be described hereinafter with reference to the accompanying drawings.

In general, according to one embodiment, a data processing apparatus is applied to a data management system. The data processing apparatus is connected to a client terminal, a first storage medium and a second storage medium to be capable of communicating with the client terminal and the first and second storage mediums. The first storage medium stores a plurality of tables which are identified by table names and include a plurality of column names and columns corresponding to the column names, respectively. The second storage medium stores some data in the tables stored in the first storage medium and keys for use in reading out the data, in association with each other. The data processing apparatus includes a temporary memory, and a hardware processor in communication with the temporary memory. The hardware processor is configured to search, if receiving from the client terminal an update request for updating data in a table stored in the first storage medium, the first storage medium to acquire a column and a column name of data to be updated in accordance with the update request. The hardware processor is configured to write data associating the acquired column and column name with each other to the temporary memory. The hardware processor is configured to execute updating on the data to be updated, in accordance with the received update request. The hardware processor is configured to commit the updating on the data to be updated that is stored in the first storage medium, if receiving, after the updating is executed, from the client terminal an updating committing request for committing the updating, and add updating committing data indicating that the updating has been committed to data including the column and the column name of the data to be updated that is stored in the temporary memory. The hardware processor is configured to delete from a group of data stored in the second storage medium, data including the column and the column name of data to which the updating committing data is added.

Embodiments will be described hereinafter with reference to the accompanying drawings.

First Embodiment

FIG. 1 is a block diagram schematically illustrating a configuration view of a data management system to which a data processing apparatus according to a first embodiment is applied. A data management system 1 includes an RDB 11, an in-memory KVS, a client terminal 13, a data processing apparatus 14, etc.

The RDB 11 includes a plurality of tables which include a plurality of column names and a plurality of columns corresponding to the column names, respectively, and which are identified by a plurality of table names, respectively. Also, upon reception of an acquisition request SQL from the client terminal 13 through the data processing apparatus 14, the RDB 11 sends a return value determined in accordance with the acquisition request SQL. The RDB 11 is composed of a so-called hard disk drive (HDD), etc.

The in-memory KVS 12 is a storage medium which stores data and a key (for example, an acquisition request SQL) for identifying the data in a one-to-one correspondence. It should be noted that in the first embodiment, the in-memory KVS 12 is a KVS in which a data storage region is provided in a memory to enable processing to be performed at high speed, not a KVS which uses a so-called HDD as a data storage region.

The client terminal 13 has a function of issuing an acquisition request SQL for acquiring data stored in the RDB 11, and receiving a return value determined in accordance with the acquisition request SQL. Also, the client terminal 13 has a function of issuing an update request SQL (for example, a change request SQL or an insertion request SQL) for executing updating on the data stored in the RDB 11. Furthermore, the client terminal 13 has a function of issuing a committing request SQL for committing the updating executed in response to the update request SQL and a rolling-back request SQL for rolling back the data subjected to the updating.

The data processing apparatus 14, as shown in FIG. 1, includes a client communication module 141, a cache controller 142, an RDB communication module 143, an update working memory 144, etc. In the following, the functions of the above elements 141 to 144 in the data processing apparatus 14 which are used in at the time of performing data acquisition processing are explained, and then, the functions of the above elements 141 to 144 in the data processing apparatus 14 which are used in at the time of performing data updating processing are explained.

First of all, the functions of the above elements 141 to 144 in the data processing apparatus 14 which are used in at the time of performing the data acquisition processing will be explained.

The client communication module 141 has a function of receiving an acquisition request SQL issued by the client terminal 13 and sending the acquisition request SQL to the cache controller 142, and also a function of sending a return value determined in accordance with the acquisition request SQL to the client terminal 13.

The cache controller 142 has a function of searching, upon reception of the acquisition request SQL sent from the client communication module 141, the in-memory KVS 12 using the acquisition request SQL as a key. Furthermore, the cache controller 142 has a function of sending, if in the search, it has acquired from the in-memory KVS 12 the return value determined in accordance with the acquisition request SQL, the return value to the client communication module 141. Also, the cache controller 142 has a function of sending (transferring), if in the search, it has not acquired from the in-memory KVS 12 the return value determined in accordance with the acquisition request SQL, the acquisition request SQL to the RDB communication module 143.

Upon of reception of the acquisition request SQL sent from the cache controller 142, the RDB communication module 143 sends the acquisition request SQL to the RDB 11 to acquire the return value determined in accordance with the acquisition request SQL, and also by use of the cache controller 142 registers the acquired return value in the memory KVS 12 using the acquisition request SQL as a key. The acquired return value is sent to the client communication module 141.

It should be noted that the update working memory 144 is not used at the time of performing the data acquisition processing.

Next, the functions of the above elements 141-144 in the data processing apparatus 14 which are used at the time of performing the data updating processing will be explained. It should be noted that the data updating processing is divided into data updating processing to be executed in accordance with the change request SQL and data updating processing to be executed in accordance with the insertion request SQL. The functions of the above elements 141 to 144 in the data processing apparatus 14 which are used in at the time of performing the data updating processing in accordance with the change request SQL will be explained, and then, the functions of the above elements 141 to 144 in the data processing apparatus 14 which are used in at the time of performing the data updating processing in accordance with the insertion request SQL will be explained.

First, the functions of the above elements 141 to 144 in the data processing apparatus 14 which are used in at the time of performing the data updating processing in accordance with the change request SQL will be explained.

The client communication module 141 has a function of receiving a row lock request SQL issued by the client terminal 13, and sending the row lock request SQL to the RDB communication module 143. The row lock request SQL is a request SQL which is issued from the client terminal 13 before changing (updating) data stored in the RDB 11, and which requests restriction on an access from another resource to a row (or a table) including data to be updated. It should be noted that upon reception of the row lock request SQL sent from the client communication module 141, the RDB communication module 143 sends the row lock request SQL to the RDB 11, restricts an access of another resource to a row including data to be updated (it locks the row), and writes lock data indicating the locked row to the update working memory 144.

Furthermore, the client communication module 141 has a function of receiving a change request SQL issued by the client terminal 13, and sending the change request SQL to the RDB communication module 143.

The RDB communication module 143 has a function of confirming, upon reception of a change request SQL sent from the client communication module 141, whether a row (or a table) including data (in the RDB 11) to be updated in accordance with the change request SQL is locked in advance or not, by referring to the update working memory 144.

If the RDB communication module 143 confirms that the row is not locked in advance, it restricts an access of another resource to the row including the data to be updated in accordance with the change request SQL (it locks the row), and then searches the tables stored in the RDB 11 for the row including the data to be updated. At this time, the RDB communication module 143 writes lock data indicating the locked row to the update working memory 144. On the other hand, if the RDB communication module 143 confirms that the row including the data to be updated is locked in advance, it executes only processing for searching for the row including the data to be updated.

The RDB communication module 143 also has a function of writing, after searching for the row including the data to be updated, a column and a column name of the data to be updated to the update working memory 144. Furthermore, the RDB communication module 143 has a function of sending the change request SQL to the RDB 11, and executing updating on the data to be updated.

When the RDB communication module 143 receives through the client communication module 141 a committing request SQL issued from the client terminal 13, it executes processing for committing the updating executed in accordance with the above change request SQL, and also processing for adding updating committing data indicating that the updating has been committed to a column and a column name of data not yet subjected to updating that is stored in the update working memory 144. On the other hand, when the RDB communication module 143 receives through the client communication module 141 a rolling-back request SQL issued from the client terminal 13, it executes processing for rolling back the data which has been subjected to the updating in accordance with the change request SQL.

The cache controller 142 has a function of deleting from a group of data stored in the in-memory KVS 12 data identical to data in the update working memory 144, that includes a column and a column name to which updating committing data is added. Also, the cache controller 142 has a function of deleting as necessary, lock data stored in the update working memory 144 and data stored therein to which updating committing data is added. It should be noted that the function of deleting various kinds of data stored in the update working memory 144 may be set as a function of the RDB communication module 143.

Next, the functions of the above elements 141 to 144 in the data processing apparatus 14 which are used in at the time of performing the data updating processing in accordance with the insertion request SQL will be explained.

The client communication module 141 has a function of receiving an insertion request SQL issued by the client terminal 13, and sending the insertion request SQL to the RDB communication module 143.

The RDB communication module 143 has a function of sending, upon reception of an insertion request SQL sent from the client communication module 141, the insertion request SQL to the RDB 11, and inserting data to be inserted, into a desired table stored in the RDB 11. Also, the RDB communication module 143 has a function of writing, after inserting the data to be inserted, in accordance with the insertion request SQL (the insertion succeeds), all one or more columns and one or more column names of the inserted data to the update working memory 144.

Furthermore, when the RDB communication module 143 receives through the client communication module 141 a committing request SQL issued from the client terminal 13, it executes processing for committing updating executed in accordance with the above insertion request SQL, and also processing for adding updating committing data indicating that the updating has been executed to a column and a column name of data to be subjected to insertion processing that is stored in the update working memory 144. On the other hand, when the RDB communication module 143 receives through the client communication module 141 a rolling-back request SQL issued from the client terminal 13, it executes processing for rolling back the data which has been subjected to the updating in accordance with the insertion request SQL.

The cache controller 142 has a function of deleting as necessary, data stored in the update working memory 144, to which updating committing data is added. It should be noted that the function of deleting various kinds of data stored in the update working memory 144 may be set as a function of the RDB communication module 143.

Next, an example of the procedure of the data updating processing to be executed by the data processing apparatus 14 having the above structure will be explained with reference to the flow chart of FIG. 2. The explanation is given with respect to the procedure of the data updating processing to be executed in accordance with the change request SQL.

First, the client communication module 141 receives a change request SQL issued by the client terminal 13, and sends the change request SQL to the RDB communication module 143 (block B1).

Next, upon reception of the change request SQL sent from the client communication module 141, the RDB communication module 143 refers to the update working memory 144 and confirms whether a row (or a table) including data (in the RDB 11) to be updated in accordance with the change request SQL is locked in advance or not (block B2).

If it is confirmed in block B2 that the above row is locked in advance (YES in block B2), the RDB communication module 143 searches the tables stored in the RDB 11 for the row including the data to be updated (block B3). It should be noted that when the processing of block B3 ends, the processing to be executed proceeds to the processing of block B5 to be described later.

On the other hand, if it is confirmed in block B2 that the row including the data to be updated in accordance with the change request SQL is not locked in advance (No in block B2), the RDB communication module 143 locks the row, and then searches for the tables stored in the RDB 11 for the row. Then, the RDB communication module 143 writes lock data indicating the locked row to the update working memory 144 (block B4).

Subsequently, when the RDB communication module 143 has searched for the row, it writes a column and a column name of the data to be updated to the update working memory 144 (block B5). Next, the RDB communication module 143 sends the change request SQL to the RDB 11, and executes updating on the data to be updated (block B6).

When the processing of blocks B1 to B6 has been executed, the client communication module 141 sends a response to the client terminal 13 (block B7). That is, the client communication module 141 notifies the client terminal 13 that the processing executed in accordance with the change request SQL has ended.

Then, the client communication module 141 receives a request SQL issued from the client terminal 13, and confirms whether the request SQL is a rolling-back request SQL or a committing request SQL (block B8). It should be noted that if it is confirmed in step S8 that the request SQL is a committing request SQL, the processing to be executed proceeds to block B13 to be described later.

If it is confirmed in block B8 that the request SQL is a rolling-back request SQL (rolling-back request SQL in block B8), the client communication module 141 sends the rolling-back request SQL to the RDB communication module 143 (step B9).

Next, upon reception of the rolling-back request SQL sent from the client communication module 141, the RDB communication module 143 sends the rolling-back request SQL to the RDB 11, and executes processing for rolling-back the data that has been subjected to the updating in accordance with the change request SQL. It should be noted that when the processing for rolling back the data subjected to the updating in accordance with the rolling-back request SQL has been executed, in the RDB 11, the locked row including the data to be updated is automatically released (block B10). Then, the RDB communication module 143 deletes the column and column name of the data to be updated and the lock data stored in the update working memory 144 (block B11).

Thereafter, the client communication module 141 sends a response to the client terminal 13; that is, it notifies the client terminal 13 that the processing executed in accordance with the rolling-back request SQL has ended (block B12), and causes the data updating processing to be ended.

If it is confirmed in block B8 that the request SQL is a committing request SQL (committing request SQL in block B7), the client communication module 141 sends the committing request SQL to the RDB communication module 143 (block B13).

Then, upon reception of the committing request SQL sent from the client communication module 141, the RDB communication module 143 sends the committing request SQL to the RDB 11, and executes processing for committing updating executed in accordance with the change request SQL. It should be noted that when the processing for committing the updating in accordance with the committing request SQL has been executed, in the RDB 11, the locked row including the data to be updated is automatically released (block B14). Next, the RDB communication module 143 adds updating committing data indicating that the updating on the column and column name of the data to be updated that is stored in the update working memory 144 has been committed (block B15).

When the processing of blocks B8 and B13 to B15 has been executed, the client communication module 141 sends a response to the client terminal 13 (block B16). That is, the client communication module 141 notifies the client terminal 13 that the processing executed in accordance with the committing request SQL has ended.

Then, the cache controller 142 deletes the data in the update working memory 144, that includes the column and the column name to which the updating committing data is added, from a group of data stored in the in-memory KVS 12 (block B17).

Thereafter, the cache controller 142 deletes from the update working memory 144 the lock data and the column and column name of the data to which the updating committing data is added (block B18), and causes the data updating processing to be ended.

According to the first embodiment explained above, at the time of performing the data acquisition processing, first, the in-memory KVS 12 is referred to, and if desired data cannot be acquired from the in-memory KVS 12, the data processing apparatus 14 executes processing for accessing the RDB 11. Thus, a user who operates the client terminal 13 can speedily acquire desired data without the need to change the data storage to be accessed.

Furthermore, according to the first embodiment, at the time of performing the data updating processing, the processing for deleting data not yet subjected to the updating that is stored in the in-memory KVS 12 is executed by the data processing apparatus 14. Thus, after the data updating processing, the client terminal 13 is prevented from acquiring data not yet subjected to the updating, from the in-memory KVS 12.

Second Embodiment

FIG. 3 is a block diagram schematically illustrating a configuration example of a data management system to which a data processing apparatus according to the second embodiment is applied. In addition to the structure as shown in FIG. 1, the data management system 1 as shown in FIG. 3 further includes a KVS journal 15 and the data processing apparatus 14 further includes a delay update processor 145. In the following explanation, functions different from those in the first embodiment are primarily explained.

First, the KVS journal 15 will be described.

The KVS journal 15 is a storage medium which stores a log file regarding data updating processing executed by the data processing apparatus 14, and is connected to the in-memory KVS 12 in such a way as to be able to communicate therewith. It should be noted that the KVS journal 15, as well as the RDB 11, is composed of a so-called HDD or the like. Thus, even if the data stored in the in-memory KVS 12 is deleted because of stopping of the data management system 1 or like, the log file stored in the KVS journal 15 is not deleted. In the second embodiment, the KVS journal 15 is provided outside the data processing apparatus 14; however, it may be provided in the data processing apparatus 14.

The delay update processor 145 has a function of requesting, when the data management system 1 is stopped, the in-memory KVS 12 to recompose a given kind of request SQL (for example, a change request SQL, a committing request SQL, or the like) issued from the client terminal 13 and stored once in the in-memory KVS 12, on the basis of the log file stored in the KVS journal 15. Also, the delay update processor 145 has a function of re-executing the data updating processing interrupted because of stopping of the data management system 1, in accordance with the request SQL recomposed by the in-memory KVS 12.

Next, an example of the procedure of the data updating processing to be executed by the data processing apparatus 14 according to the second embodiment will be explained with reference to the flow chart of FIG. 4. The explanation will be given with respect to the procedure of the data update processing to be executed in accordance with a change request SQL.

First, the client communication module 141 receives a change request SQL issued by the client terminal 13, and sends the change request SQL to the RDB communication module 143 (block B21). It should be noted that the client communication module 141 also sends the received change request SQL to the cache controller 142 as necessary.

Next, upon reception of the change request SQL sent from the client communication module 141, the RDB communication module 143 refers to the update working memory 144, and confirms whether a row (or a table) including data to be updated (in the RDB 11) in accordance with the change request SQL is locked in advance or not (block B22).

If it is confirmed in block B22 that the row is locked in advance (YES in block B22), the RDB communication module 143 searches a plurality of tables stored in the RDB for the row including the data to be updated (block B23). It should be noted that when the processing of block B23 has ended, the processing to be executed proceeds to the processing of block B25 to be described later.

On the other hand, if it is confirmed in block B22 that the row is not locked in advance (No in block B22), the RDB communication module 143 locks the row including the data to be updated in accordance with the change request SQL, and then searches the tables stored in the RDB 11 for the row including the data to be updated. Then, the RDB communication module 143 writes lock data indicating the locked row to the update working memory 144 (block B24).

Subsequently, when the RDB communication module 143 has searched for the row including the data to be updated, it writes a column and a column name of the data to be updated to the update working memory 144 (block B25).

When the column and column name of the data to be updated have been written to the update working memory 144, the cache controller 142 writes the change request SQL sent from the client communication module 141 to the in-memory KVS 12 (block B26). It should be noted that when the change request SQL has been written to the in-memory KVS 12, a log file indicating that the change request SQL has been written to the in-memory KVS 12 is recorded in the KVS journal 15 as necessary.

When the processing of blocks B21 to B26 has been executed, the client communication module 141 sends a response to the client terminal 13 (block B27). That is, the client communication module 141 notifies the client terminal 13 that the processing executed in accordance with the change request SQL has ended.

Then, the client communication module 141 receives a request SQL issued from the client terminal 13, and confirms whether the request SQL is a rolling-back request SQL or a committing request SQL (block B28). It should be noted that if it is confirmed in block B28 that the request SQL is a committing request SQL, the processing to be executed proceeds to block B33 to be described later.

If it is confirmed in block B28 that the request SQL is a rolling-back request SQL (rolling-back request SQL in block B28), the client communication module 141 sends the rolling-back request SQL to the RDB communication module 143. It should be noted that if the rolling-back request SQL is sent to the RDB communication module 143, in the RDB 11, the locked row including the data to be updated is automatically released (block B29).

Then, upon reception of a rolling-back request SQL sent from the client communication module 141, the RDB communication module 143 deletes the column and column name of the data to be updated and lock data stored in the update working memory 144, in accordance with the rolling-back request SQL (block B30).

When various data stored in the update working memory 144 has been deleted, the cache controller 142 deletes a change request SQL stored in the in-memory KVS 12 (block B31).

Thereafter, the client communication module 141 sends a response to the client terminal 13; that is, it notifies the client terminal 13 that the processing executed in accordance with the rolling-back request SQL has ended (block B32), and causes the data updating processing to be ended.

If it is confirmed in block B28 that the request SQL is a committing request SQL (committing request SQL in block B28), the client communication module 141 sends the committing request SQL to the cache controller 142 (block B33).

Next, upon reception of the committing request SQL sent from the client communication module 141, the cache controller 142 writes the committing request SQL to the in-memory KVS 12 (block B34). It should be noted that when the committing request SQL has been written to the in-memory KVS 12, a log file indicating that the committing request SQL has been written to the in-memory KVS 12 is recorded in the KVS journal 15 as necessary.

When the committing request SQL has been written to the in-memory KVS 12, the RDB communication module 143 adds updating committing data indicating that updating has been committed to the column and column name of the data to be updated that is stored in the update working memory 144 (block B35).

When the processing of blocks B28 and B33 to B35 has been executed, the client communication module 141 sends a response to the client terminal 13 (block B36). That is, the client communication module 141 notifies the client terminal 13 that the processing executed in accordance with the committing request SQL has ended.

Then, nonsynchronously with sending of the response to the client terminal 13, the delay update processor 145 acquires using the cache controller 142 a committing request SQL and a change SQL stored in the in-memory KVS 12, sends these requests SQL to the RDB 11, and executes processing for executing updating on data to be updated that is stored in the RDB 11, and for committing the updating. It should be noted that when the processing for committing the updating in accordance with the committing request SQL has been executed, in the RDB 11, the locked row including the data to be updated is automatically released (block B37).

When the update processing and updating committing processing on the data to be updated have been executed, the delay update processor 145 deletes the change request SQL and committing request SQL stored in the in-memory KVS 12 (block B38). Furthermore, the delay update processor 145 deletes data including a column and a column name of data to which updating committing data is added, from a group of data stored in the in-memory KVS 12 (block B39).

Thereafter, the delete update processor 145 deletes from the update working memory 144 the lock data and the column and column name of the data to which the updating committing data is added (block B40), and causes the data updating processing to be ended.

According to the second embodiment explained above, even if the data management system 1 is stopped during the data updating processing, after the system is restarted, the change request SQL and committing request SQL stored in the in-memory KVS 12 can be re-composed based on the log file stored in the KVS journal 15. Accordingly, the data updating processing can be re-executed without the need to re-issue these requests SQL from the client terminal 13. Furthermore, the updating committing processing and the data updating processing, which require the maximum response time with respect to the data update on the RDB 11, are executed after sending a response to the client terminal 13, while it is ensured that data is changed. Accordingly, the response can be more speedily sent to the client terminal 13.

According to at least one of the above explained embodiments, it is possible to achieve a proper data management method using the RDB 11 and the in-memory KVS 12 in combination.

Since the processing of the embodiments can be implemented by a computer program, advantages which are the same as or similar to those of the embodiments can easily be obtained by merely installing the computer program in a computer via a computer-readable storage medium in which the computer program is stored and by merely executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus in a data management system and connected to a client terminal, a first storage medium, and a second storage medium capable of communicating with the client terminal and the first and second storage mediums, the first storage medium storing a plurality of tables which are identified by table names and include a plurality of column names and columns corresponding to the column names, respectively, and the second storage medium storing some data in the tables stored in the first storage medium and keys for use in reading out the data, in association with each other, the data processing apparatus comprising:
a temporary memory, and
a hardware processor in communication with the temporary memory, the hardware processor configured to:
search, if receiving from the client terminal a first update request for changing first data in a table stored in the first storage medium, the first storage medium to acquire a column name and a column of the first data to be changed in accordance with the first update request;
write data associating the acquired column name and column of the first data with each other to the temporary memory;
execute updating on the first data to be changed in accordance with the received first update request after writing the data associating the acquired column name and column of the first data with each other to the temporary memory;
insert, if receiving from the client terminal a second update request for inserting second data into the table stored in the first storage medium, the second data into the table and execute updating in accordance with the second update request;
write, if updating the second data in accordance with the second update request succeeds, data in which a column name and a column of the second data are associated with each other to the temporary memory;
commit the updating on either of the first data and the second data to be updated that is stored in the first storage medium, if receiving, after the updating is executed, from the client terminal an updating committing request for committing the updating, and add updating committing data indicating that the updating has been committed to data including the column name and the column of either of the first data and the second data to be updated that is stored in the temporary memory; and
delete, from a group of data stored in the second storage medium, data including the column name and the column of data to which the updating committing data is added.

2. The data processing apparatus of claim 1, wherein the hardware processor is further configured to roll back, after the updating is executed on the first data to be updated, the first data to be updated, if receiving from the client terminal a rolling-back request for rolling back the first data to be updated.

3. The data processing apparatus of claim 1, wherein the data management system further comprises a third storage medium which stores a log file concerning data updating processing and the hardware processor is further configured to:
write, if receiving the update request and the updating committing request, each of the update request and the updating committing request to the second storage medium;
re-compose, in a case where the data management system stops, the update request and the updating committing request based on a log file in the third storage medium, which indicates that the update request and the updating committing request have been written to the second storage medium; and
re-execute data updating processing in accordance with the re-composed update request and updating committing request.

4. The data processing apparatus of claim 1, wherein the hardware processor is further configured to:
search, if receiving an acquisition request from the client terminal, the second storage medium using the acquisition request as the key;
send, in a case where as a result of the search, a return value determined in accordance with the acquisition request is acquired from the second storage medium, the return value to the client terminal; and
acquire, in a case where as the result of the search, the return value determined in accordance with the acquisition request is not acquired from the second storage medium, the return value from the first storage medium, send the return value to the client terminal, and write the return value to the second storage medium in accordance with the acquisition request.

5. A method to be carried out by a data processing apparatus in a data management system and connected to a client terminal, a first storage medium, and a second storage medium capable of communicating with the client terminal and the first and second storage mediums, the first storage medium storing a plurality of tables which are identified by table names and include a plurality of column names and columns corresponding to the column names, respectively, and the second storage medium storing some data in the tables stored in the first storage medium and keys for use in reading out the data, in association with each other, the method comprising:
searching, if receiving from the client terminal a first update request for changing first data in a table stored in the first storage medium, the first storage medium to acquire a column name and a column of the first data to be changed in accordance with the first update request;
writing data associating the acquired column name and column of the first data with each other to a temporary memory;
executing updating on the first data to be changed in accordance with the received first update request after writing the data associating the acquired column name and column of the first data with each other to the temporary memory;
inserting, if receiving from the client terminal a second update request for inserting second data into the table stored in the first storage medium, the second data into the table and execute updating in accordance with the second update request;
writing, if updating the second data in accordance with the second update request succeeds, data in which a column name and a column of the second data are associated with each other to the temporary memory;

committing the updating on either of the first data and the second data to be updated that is stored in the first storage medium, if receiving, after the updating is executed, from the client terminal an updating committing request for committing the updating, and adding updating committing data indicating that the updating has been committed to data including the column name and the column of either of the first data and the second data to be updated that is stored in the temporary memory;

deleting, from a group of data stored in the second storage medium, data including the column name and the column of the data to which the updating committing data is added.

6. The method of claim 5, further comprising:

rolling back, after the updating is executed on the first data to be updated, the first data to be updated, if receiving from the client terminal a rolling-back request for rolling back the first data to be updated.

7. The method of claim 5, wherein the data management system further comprises a third storage medium which stores a log file concerning data updating processing, the method further comprising:

writing, if receiving the update request and the updating committing request, each of the update request and the updating committing request to the second storage medium;

re-composing, in a case where the data management system stops, the update request and the updating committing request based on a log file in the third storage medium, which indicates that the update request and the updating committing request have been written to the second storage medium; and re-executing data updating processing in accordance with the re-composed update request and updating committing request.

8. The method of claim 5, further comprising:

searching, if receiving an acquisition request from the client terminal, the second storage medium, using the acquisition request as the key;

sending, in a case where as a result of the search, a return value determined in accordance with the acquisition request is acquired from the second storage medium, the return value to the client terminal; and acquiring, in a case where as the result of the search, the return value determined in accordance with the acquisition request is not acquired from the second storage medium, the return value from the first storage medium, sending the return value to the client terminal, and writing the return value to the second storage medium in accordance with the acquisition request.

* * * * *